US008630908B2

(12) United States Patent
Forster (10) Patent No.: US 8,630,908 B2
(45) Date of Patent: Jan. 14, 2014

(54) DISTRIBUTED POINT OF SALE, ELECTRONIC ARTICLE SURVEILLANCE, AND PRODUCT INFORMATION SYSTEM, APPARATUS AND METHOD

(75) Inventor: Ian James Forster, Essex (GB)

(73) Assignee: Avery Dennison Corporation, Mentor, OH (US)

( * ) Notice: Subject to any disclaimer, the term of this patent is extended or adjusted under 35 U.S.C. 154(b) by 0 days.

(21) Appl. No.: 13/287,269

(22) Filed: Nov. 2, 2011

(65) Prior Publication Data

US 2013/0110657 A1 May 2, 2013

(51) Int. Cl.
*G06Q 20/00* (2012.01)
*G06Q 20/32* (2012.01)
*G06Q 20/20* (2012.01)

(52) U.S. Cl.
CPC ........... *G06Q 20/3278* (2013.01); *G06Q 20/32* (2013.01); *G06Q 20/20* (2013.01)
USPC ............................................... 705/17; 705/16

(58) Field of Classification Search
CPC ........................... G06Q 20/3278; G06Q 20/32
USPC ............................................... 705/16, 17
See application file for complete search history.

(56) References Cited

U.S. PATENT DOCUMENTS

| 8,321,922 | B1 * | 11/2012 | Lo et al. .............................. 726/7 |
| 8,332,272 | B2 * | 12/2012 | Fisher ............................. 705/16 |
| 2002/0186133 | A1 * | 12/2002 | Loof ........................... 340/572.1 |
| 2004/0220860 | A1 * | 11/2004 | Persky et al. .................... 705/23 |
| 2005/0017071 | A1 * | 1/2005 | Noonan ......................... 235/385 |
| 2006/0160488 | A1 | 7/2006 | Sueoka et al. |
| 2008/0079582 | A1 * | 4/2008 | Alexis et al. ................ 340/572.1 |
| 2008/0150719 | A1 * | 6/2008 | Cote et al. .................. 340/572.1 |
| 2008/0191878 | A1 * | 8/2008 | Abraham ................... 340/572.1 |
| 2008/0251582 | A1 | 10/2008 | Nguyen |
| 2010/0009627 | A1 | 1/2010 | Huomo |
| 2010/0012715 | A1 | 1/2010 | Williams et al. |
| 2010/0141452 | A1 * | 6/2010 | Lian et al. .................. 340/572.3 |
| 2010/0231362 | A1 * | 9/2010 | Smith et al. ................. 340/10.42 |
| 2011/0195748 | A1 * | 8/2011 | Main et al. ..................... 455/557 |
| 2013/0006847 | A1 * | 1/2013 | Hammad et al. ................ 705/39 |

FOREIGN PATENT DOCUMENTS

WO    2008034937    3/2008

OTHER PUBLICATIONS

Ghanname, Taoufik. How NFC can to speed Bluetooth transactions—today. EEtimes. Feb. 14, 2006. Retrieved at http://www.eetimes.com/General/PrintView/4012606.*

Newport Digital Technologies to Implement Microsoft Licensing Agreement; Prepares to Launch First Ruggedized RFID Reader with the Windows Mobile Operating System. Business Wire. Oct. 30, 2009.*

(Continued)

*Primary Examiner* — Scott Zare
(74) *Attorney, Agent, or Firm* — Avery Dennison Corporation (57) ABSTRACT

A distributed point of sale, electronic article surveillance, and product information system. The system can include a central database and at least one integrated POS/EAS/information terminal adapted to communicate with NFC-enabled devices, RFID and EAS tags, and the database, wherein, when a customer places an NFC-enabled device and a product having an RFID and EAS tag and proximate the terminal, the terminal facilitates a transaction for purchasing the product. The terminal can include a processor, an NFC transceiver, a UHF RFID reader, and a Bluetooth transceiver. The transaction for purchasing the product can be performed via the NFC-enabled device.

18 Claims, 4 Drawing Sheets

(56) References Cited

OTHER PUBLICATIONS

Amato-McCoy, Deena M. Crime stoppers: by focusing their loss prevention efforst on the entire enterprise, grocers are in a better position to combat internal and external theft. Grocery Headquarters, v 77, n 11, p 101 (3). Nov. 2011.*

RFID Inventory Management System. Package Printing, v57 n2, pp. 34. Feb. 2010.*
"Bling: NFC Arrives in U.S.", Sam Churchill, Paypal (Oct. 27, 2010).
"Enabling RFID in Retail", G. Roussos, Birkbeck, University of London (Mar. 2006).

* cited by examiner

DISTRIBUTED POINT OF SALE, ELECTRONIC ARTICLE SURVEILLANCE, AND PRODUCT INFORMATION SYSTEM, APPARATUS AND METHOD

BACKGROUND OF THE INVENTION

The use of radio frequency identification (RFID) tags to track, identify and locate goods has grown significantly in recent years. RFID tags allow manufacturers, distributors and retailers, amongst others, to regulate products and inventory, quickly determine production, manufacture, distribution or retail needs and efficiently intake and outtake items utilizing RFID tags. The RFID tags themselves can provide any desired product data and may be scanned or read in any of a variety of manners. One application of such devices is in electronic article surveillance (EAS) tags, which are commonly used to prevent unauthorized removal of inventory from a controlled area. The EAS tags may be paired with a detection system that is located at a boundary of the controlled area, and which generates an alert when an EAS tag is detected proximate to the detection system, unless the EAS tag is disabled. Typically, EAS tags are disabled at the point-of-sale, which in many establishments is a checkout counter that is visited after the customer has selected the items to be purchased and before exiting the establishment. The typical checkout counter format presents problems when faced with high customer volume and large quantities of products per customer, which result in long wait times and long customer queues at the checkout counter.

Near-field communication (NEC) is a type of radio frequency communication technology, operating at about 13.56 MHz and at bandwidth of about 2 MHz that allows for read-only and read-write communications between an NFC-enabled RF reader and an NFC-enabled tag. NFC operation is based on inductive coupling between two loop antennas, which allows for sharing of power and data between NFC-enabled devices. Typically, for proper operation, the distance between an NFC-enabled reader and an NFC-enabled tag typically needs to be under 20 centimeters.

NFC-enabled mobile devices can communicate with either host terminals or with tags or cards compliant with the ISO14443 standard and resonating at 13.56 MHz. Communications between the NEC-enabled mobile device and an NFC-enabled terminal can include data transfer, initiation of a wireless connection under a different communications standard, secure payment, and other functions. The secure payment capabilities of NFC-enabled devices allow one to conveniently execute financial transactions using only the NFC-enabled mobile device.

While NFC allows for secure transactions and other capabilities, NFC tag read range is limited to a few centimeters. In contrast, typical RFID tag operating ranges can extend out to several meters, depending on tag configuration and reader power. Additionally, RFID tags have a lower cost than NFC-enabled tags. These factors make RFID tags better suited for the retail environment, where functions such as inventory management, retail display monitoring, and the like require large quantities of RFID tags and greater read ranges.

A solution for integrating NEC-enabled devices, RFID-based inventory management, EAS control, and streamlined point-of-sale experiences is therefore desired.

SUMMARY OF THE INVENTION

According to at least one exemplary embodiment, a distributed point of sale, electronic article surveillance, and product information system is disclosed. The system can include a central database and at least one integrated POS/EAS/information terminal adapted to communicate with NFC-enabled devices, RFID and EAS tags, and the database, wherein, when a customer places an NFC-enabled device and a product having an RFID and EAS tag and proximate the terminal, the terminal facilitates a transaction for purchasing the product. The terminal can include a processor, an NFC transceiver, a UHF RFID reader, and a Bluetooth transceiver. The transaction for purchasing the product can be performed via the NFC-enabled device. The terminal can further provide the customer with information pertaining to the product, and the information can be displayed on the NFC-enabled device.

According to another exemplary embodiment, a method for facilitating transactions using a distributed point of sale, electronic article surveillance, and product information system, is disclosed. The method can include placing an NFC-enabled device and a product having an RFID and EAS tag in proximity to an integrated POS/EAS/information terminal, initiating an NFC link between the NFC-enabled device and the terminal, interrogating the RFID and EAS tag by the terminal, receiving information pertaining to the product from a database, presenting the customer with a list of options regarding the product, executing a selected option from the list of options and terminating the NFC link.

According to another exemplary embodiment, a terminal for a distributed point of sale, electronic article surveillance, and product information system. The terminal can include a processor, an NFC transponder, a UHF RFID reader, a Bluetooth transponder, and an 802.11-compliant antenna, wherein, upon receiving an NEC signal from an NFC-compliant device, the terminal establishes an NFC link with the NFC-compliant device, interrogates an RFID and EAS tag located proximate to the terminal, and facilitates a secure transaction for purchase of a product on which the RFID and EAS tag is disposed.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION OF THE EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Figure 1:
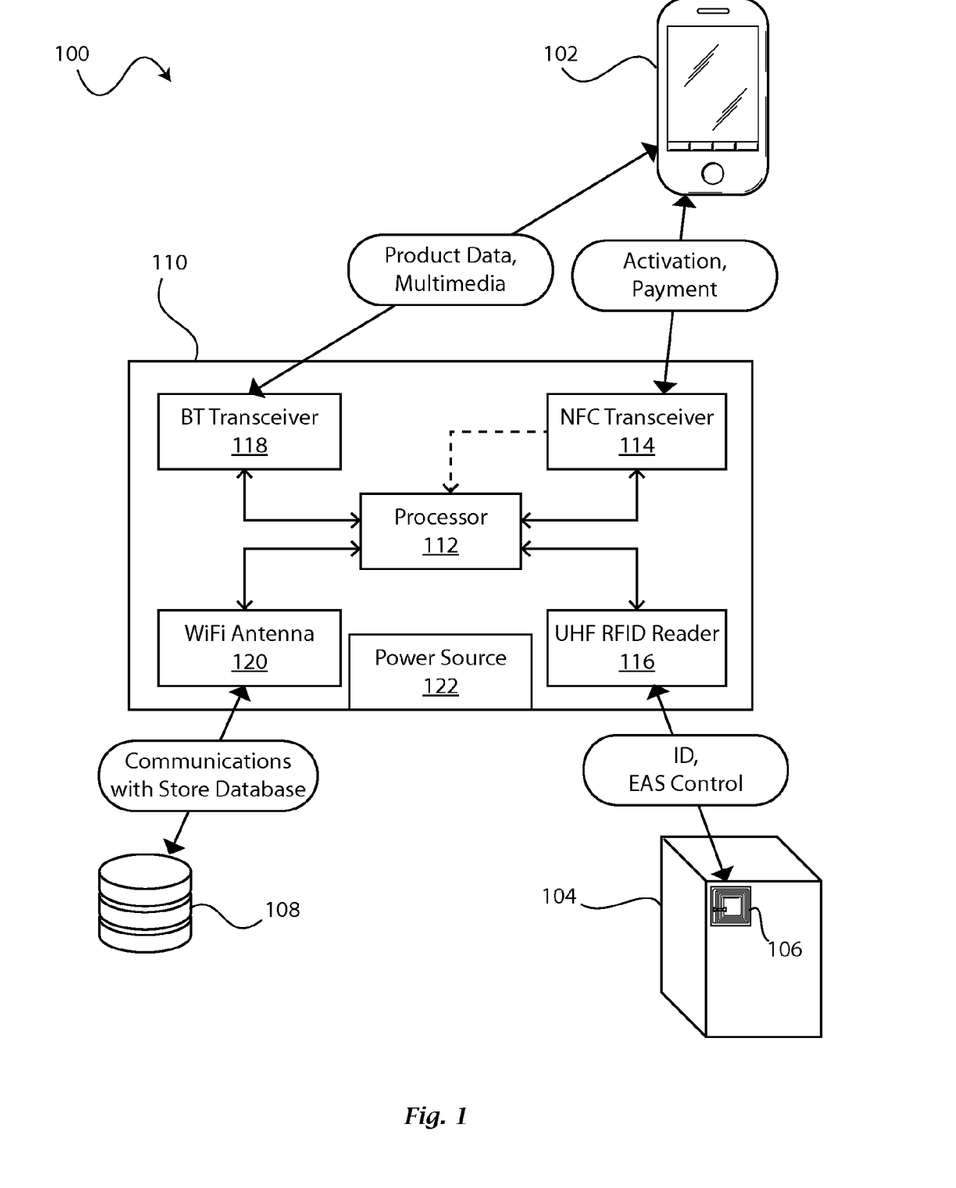
FIG. 1 shows an exemplary diagram of a distributed point of sale, electronic article surveillance, and product information system.

According to at least one exemplary embodiment, and as shown in FIG. 1, a distributed point of sale, electronic article surveillance, and product information system 100 may be disclosed. System 100 can include at least one integrated POS/EAS/information terminal 110, which may be referred to as a "pay spot." System 100 may be adapted to communicate with an NFC-enabled device 102 via pay spot 110. NFC-enabled device 102 may be, for example, a mobile communications device and may include software or logic configured to operate with system 100. Pay spot 110 may further be adapted to communicate with device 102 using Bluetooth, or any other desired short range communication protocol, if device 102 is so equipped. System 100 may further include a central database 108, or may be adapted to communicate with an existing store database for a particular retail location. Communications with database 108 may be performed via pay spot 110 and may utilize 802.11-compliant routers or repeaters that are present in the retail location.

Pay spot 110 can further be adapted to communicate with RFID tags 106. RFID tags 106 may be disposed on products 104, and may include both product identification and LAS capabilities. Thus, communications between pay spot 110 and RFID tags 106 may include product identification communications as well as communications for EAS purposes. In some embodiments, RFID tags 106 may include a secondary antenna tuned to the 13.56 MHz frequency.

Each pay spot 110 can include a processor 112, an NFC transceiver 114, an UHF RFID reader 116, a Bluetooth transceiver 118, and an 802.11-compliant Wi-Fi antenna 120. Processor 112 may be communicatively coupled to each of components 112, 114, 116 and 118. A power source 122 may further be provided, which may be any internal or external, AC or DC power source that enables system 100 to function as described herein. Additionally, a pay spot 110 can include other components, for example, but not limited to, activity indicators such as LEDs, displays that may be LCD, LED, or OLED based and that may be touch-sensitive, audio emitting components, user-operable controls, and so forth.

Each pay spot 110 can have an enclosure containing at least the above-described components. The configuration, shape, and ornamental features of the enclosure, as well as any indicia disposed thereon may be adapted for each retail location where system 100 is being used. For example, the enclosure may be configured so as to conform to the trade dress of a particular retail establishment, shopping center, airport terminal, or other location where system 100 is being used.

A plurality of pay spots 110 may be provided at a retail location such that customers shopping at the location can easily locate and interact with a pay spot and such that customers experience minimal or no queuing time. To interact with a pay spot 110, a customer would need to use an NFC-enabled device 102, such as a mobile communications device.

Figure 2A:
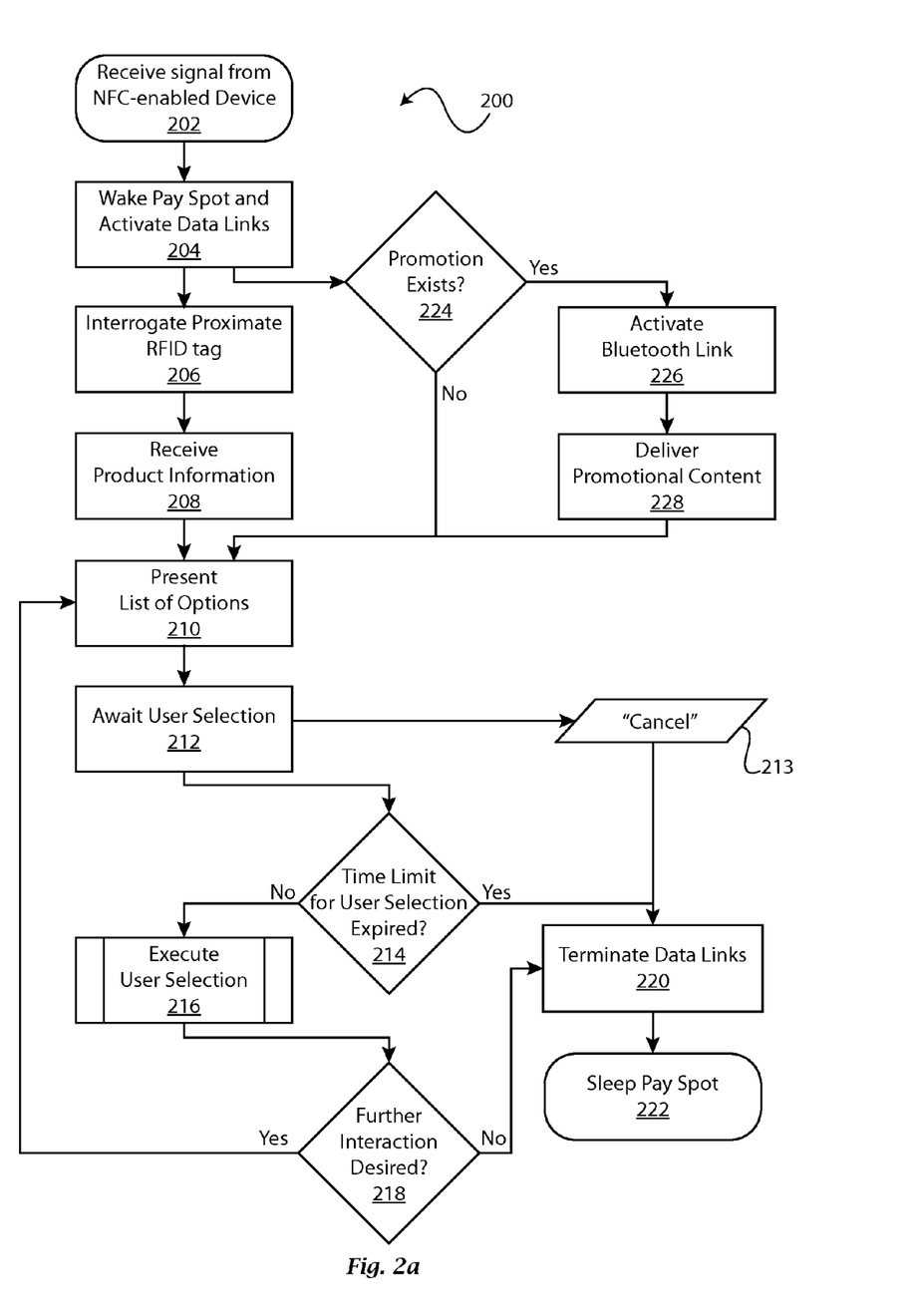
FIG. 2a shows an exemplary method for facilitating transactions using a distributed point of sale, electronic article surveillance, and product information system.

FIG. 2a illustrates an exemplary method for facilitating transactions 200 using a distributed point of sale, electronic article surveillance, and product information system. Initially, a pay spot 110 may be in a low-power "sleep" mode. At step 202, a customer may simultaneously place an NFC-enabled device 102 and a product 104 having RFID tag 106 in proximity with pay spot 110 such that both device 102 and product 104 are within the NFC field area of the pay spot. The signal from NFC-enabled device 102 can be received by NFC transceiver 114 of pay spot 110. Consequently, at step 204, the signal received by the NFC transceiver can induce processor 112 to exit the sleep mode and to activate data links between NFC transceiver 114 and mobile device 102, between RFID reader 116 and RFID tag 106, and between pay spot 110 and database 108. Communications between Bluetooth transceiver 118 and mobile device 102 may also be activated if desired.

At step 206, pay spot 110 may interrogate the RFID tag 106 of the product 104 that is in proximity to the pay spot. If RFID tag 106 includes a secondary antenna tuned to the 13.56 MHz frequency, the UHF response of the RFID tag can be modulated by the NFC transmissions between pay spot 110 and device 102. As the field area of the NFC transmissions is typically under 20 centimeters, only signals from RFID tags that are in proximity to the pay spot so as to be within the NFC field area would be thusly modulated. One or both of processor 112 and RFID reader 116 can therefore be adapted to prioritize UHF signals that are modulated by the NEC transmission, thereby reducing the likelihood of cross-reads between RFID reader 116 and other RFID tags that are located in the general vicinity of pay spot 110.

At step 208, pay spot 110 can receive identifying information about product 104 as a consequence of interrogating RFID tag 106. Once the product is identified, additional information about the product may be received from database 108. Subsequently, at step 210, the pay spot can present the customer with a list of options. The list of options may be communicated to the customer's NFC-enabled device 102 via the NFC link, and may be presented on the screen of the device. An exemplary list of options can include options to obtain information, specifications and videos about product 104, options to locate a desired size, color, or other feature of product 104, options to purchase product 104 directly or by delivery, options to cancel the transaction, and so forth. Other options to be included in the list of options may be contemplated and provided as desired, and may be customized by and for the particular retail location at which system 100 is being used.

At step 212, pay spot 110 may await the user selection. If a "cancel" request 213 is returned, pay spot 110 can proceed to step 220, whereby any active data links between pay spot 110, device 102, and database 108 are terminated. Subsequently, at step 222, pay spot can re-enter the low-power sleep mode.

If a cancel request is not received, at step 214 the pay spot can determine if a preset time limit for receiving the user selection has expired. If so, pay spot 110 can proceed to the termination and sleep procedures of steps 220 and 222.

If a cancel request is not received, and user selection is received within the time limit, pay spot 110 can execute the user selection at step 216, exemplary methods for which are described further below. Subsequent to the execution of the user selection, pay spot can prompt the user, at step 218, if further interaction is desired. If so, pay spot 110 may return to step 210, wherein the list of options of can again be presented to the user. If no further interaction is desired, pay spot 110 can proceed to the termination and sleep procedures of steps 220 and 220.

In some embodiments, promotional material may be provided to the customer during the transaction process 200. Subsequent to step 204, wherein the pay spot activates desired data links, pay spot 110 can query database 108 at step 224 to determine whether any promotional material is available to be offered to the customer. If such material is available, pay spot 110 can activate the Bluetooth link to device 102 at step 226. At step 228, promotional content, such as videos, images, text offers, coupons, and so forth may then be sent via the Bluetooth link to device 102 and displayed on the screen of the device. The promotional content delivery steps 224, 226, and 228 may be performed simultaneously with steps 206 and 208, wherein the pay spot is interrogating RFID tag 106 of product 104 and retrieving information about the product.

Figure 2B:
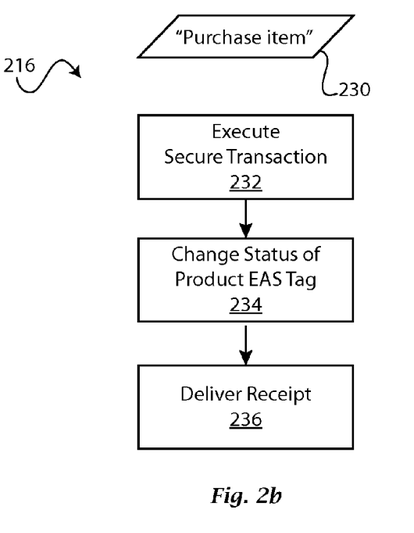
FIGS. 2b-2g show exemplary methods for executing user selections by a distributed point of sale, electronic article surveillance, and product information system.

FIG. 2b illustrates an exemplary method for executing the user selection at step 216, wherein the user selection is "purchase item" 230. Upon the user selecting "purchase item," pay spot 110 can initiate a secure transaction at step 232 via the NFC link with NFC-enabled device 102. All steps and user interactions necessary for the secure transaction may be performed on device 102 and via the communications network of device 102. Once the secure transaction is completed, at step 234, pay spot 110 can change the status of the EAS tag 106 via RFID reader 116. For example, the EAS tag 106 of product 104 may be deactivated, or may have its status set to "paid," thereby enabling the customer to remove the product from the EAS-controlled area of the retail location. Subsequently, at step 236, a purchase receipt may be delivered to the customer, via device 102, or via a known email address that is associated with the customer.

Figure 2C:
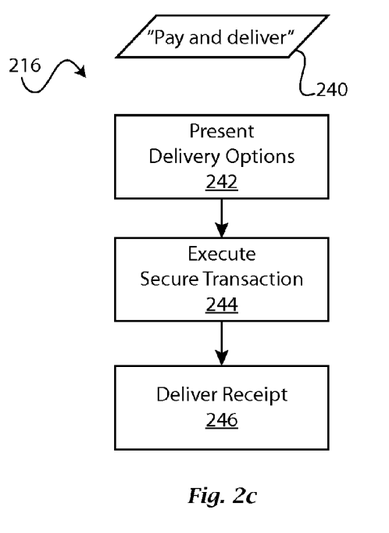

FIG. 2c illustrates an exemplary method for executing the user selection at step 216, wherein the user selection is "pay and deliver" 240. Upon the user selecting "pay and deliver," pay spot 110 can present the user, at step 242, with any available options for delivery of product 104, the corresponding delivery prices, and the address to which the item is to be delivered. The address for delivery may be a preselected default address that is automatically chosen, or the customer may be prompted to enter a delivery address or select a delivery address from a list of pre-entered addresses. The delivery options may be communicated to the customer's NFC-enabled device 102 via the NFC link, and may be presented on the screen of the device. Once the user has selected desired delivery options, pay spot 110 can initiate a secure transaction, at step 244, via the NFC link with NFC-enabled device 102. All steps and user interactions necessary for the secure transaction may be performed on device 102 and via the communications network of device 102. Subsequently, at step 246, a purchase receipt may be delivered to the customer, via device 102, or via a known email address that is associated with the customer. The "pay and deliver" method can allow the customer to conveniently request delivery of a desired product, for example, in the case of a heavy or bulky product, or in the case where the customer is purchasing a product for someone else, or if the customer simply does not desire to carry or transport the products.

Figure 2D:
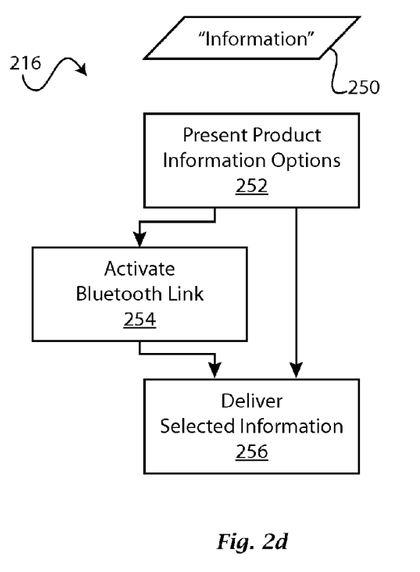

FIG. 2d illustrates an exemplary method for executing the user selection at step 216, wherein the user selection is "information" 250. Upon the user selecting "information," pay spot 110 can present the user, at step 252, with a list of information options pertaining to product 104. The information options may be communicated to the customer's NFC-enabled device 102 via the NFC link, and may be presented on the screen of the device. The product information options can include product specifications, images of the product, instruction manuals, product reviews, and any other desired information. If the selected information option requires that a substantially large data file be transmitted to device 102, pay spot 110 can activate a Bluetooth link to device 102 at step 254, and can transmit the requested data to the device 102 via Bluetooth at step 256. The requested data may be sourced, for example, from database 108. Alternatively, if the selected information option is a data file having a substantially small size, pay spot 110 can proceed directly to step 256 and transmit the requested data via the NFC link.

Figure 2E:
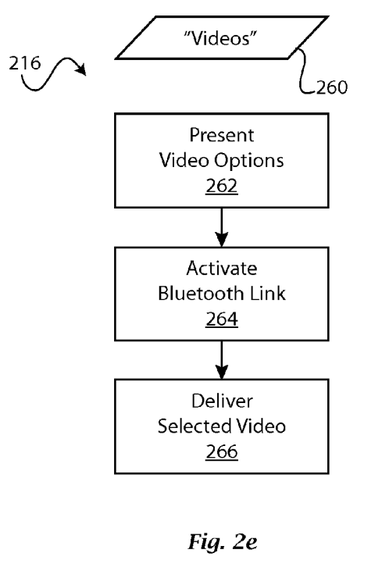

FIG. 2e illustrates an exemplary method for executing the user selection at step 216, wherein the user selection is "videos" 260. Upon the user selecting "information," pay spot 110 can present the user, at step 262, with a list of video options pertaining to product 104. The video options may be communicated to the customer's NFC-enabled device 102 via the NEC link, and may be presented on the screen of the device. Once the customer selects a video option, pay spot 110 can activate a Bluetooth link to device 102 at step 264, and can transmit the requested video to the device 102 via Bluetooth at step 266. The requested video may be sourced, for example, from database 108.

Figure 2F:
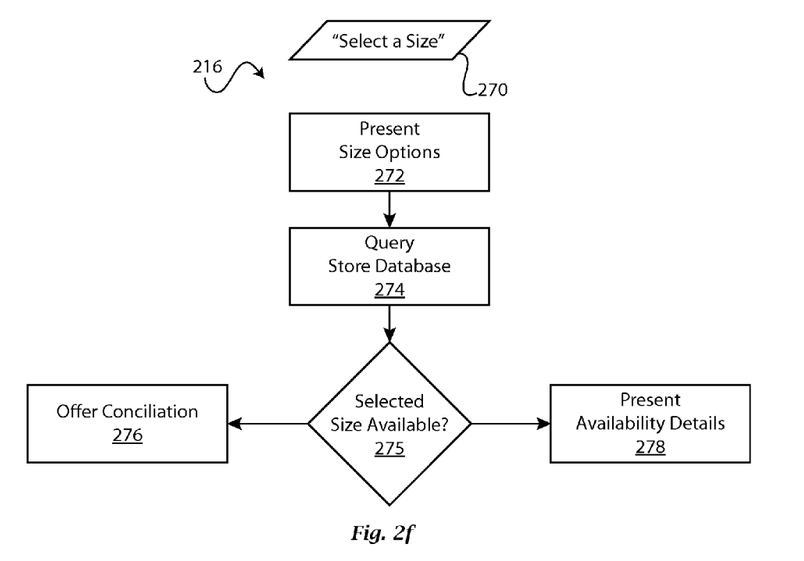

FIG. 2f illustrates an exemplary method for executing the user selection at step 216, wherein the user selection is "find a size" 270. Upon the user selecting "find a size," pay spot 110 can present the user, at step 272, with a list of size options pertaining to product 104. The size options may be communicated to the customer's NFC-enabled device 102 via the NFC link, and may be presented on the screen of the device. Once the customer selects a size option, pay spot 110 can query database 108 at step 274. At step 275, pay spot 110 can use the query results to determine whether product 104 in the desired size is present in the inventory of the retail location. If the desired product is present, pay spot 110 can present further details about the matching products to the customer at step 278, including the option to purchase. If the desired product is not in inventory, pay spot 110 can present a conciliation offer to the customer at step 276. Such conciliation offers can include free delivery of the product, discounts and coupons, gift cards, or any other desired offer that may be contemplated. The conciliation offers can be customized by and for the particular retail location at which system 100 is being used.

Figure 2G:
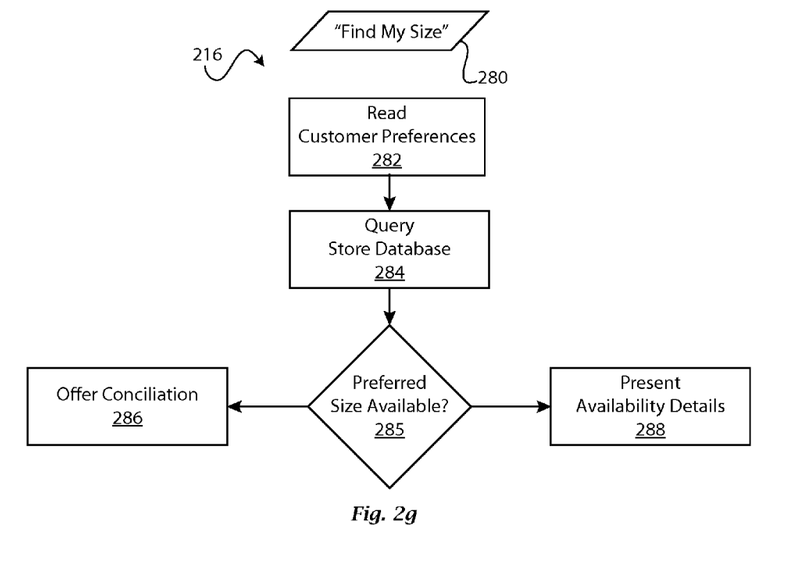

FIG. 2g illustrates an exemplary method for executing the user selection at step 216, wherein the user selection is "find my size" 280. For method 280, the customer may have pre-entered desired customer preferences into NFC-enabled device 102. These preferences can include any preferred characteristic for any product or can be a pre-defined set of characteristics, such as preferred sizes, colors, features, and so forth. The customer preferences may then be cross referenced with a product 104 so as to present the customer with variations of a product 104 that conform to the customer's preferences.

Upon the user selecting "find my size," pay spot 110 can obtain customer preferences from NFC-enabled device 102, at step 282. The color options may be communicated to the customer's NFC-enabled device 102 via the NFC link, and may be presented on the screen of the device. If the customer preferences do not match the characteristics of the scanned product 104, pay spot 110 can query database 108 at step 284. At step 285, pay spot 110 can use the query results to determine whether there are any products present in the inventory of the retail location that conform to the user preferences. If the desired product is present, pay spot 110 can present further details about matching products to the customer at step 288, including the option to purchase. If the desired product is not in inventory, pay spot 110 can present a conciliation offer to the customer at step 286. Such conciliation offers can include free delivery of the product, discounts and coupons, gift cards, or any other desired offer that may be contemplated. The conciliation offers can be customized by and for the particular retail location at which system 100 is being used.

The exemplary methods of steps 216 for user selections 270 and 280 may be adapted for any desired characteristic of a particular product, and can vary based on the type of product that is being interrogated. Options for selecting a particular characteristic of a product can be customized by and for the particular retail location at which system 100 is being used.

The embodiments of the systems and methods disclosed herein can thus provide a simple, secure and convenient way for customers to purchase products through secure transactions conducted via terminals distributed in a retail location. The availability of multiple distributed terminals facilitates reducing queuing and wait times for purchasing products and can reduce the amount of personnel necessary for point-of-sale and electronic article surveillance operations. The terminals can allow customers to have a multimedia experience by providing information regarding the products, and can further allow customers to have the products delivered to a location of their choice. Thus, the systems and methods disclosed herein may be used in locations with limited floor space, where a limited local inventory may be maintained for demonstration purposes, while purchased products can be delivered from a remote storage location. Furthermore, these systems and methods may be combined with subscription delivery plans, where a customer may opt to receive free or discounted rapid delivery in exchange for a periodic fee. Thus, the systems and methods disclosed herein can result in substantial cost savings to retail operators as well as increased convenience for customers.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for facilitating transactions using a distributed point of sale, electronic article surveillance, and product information system, comprising:
    placing an NFC-enabled device and a product having an RFID and EAS tag in proximity to an integrated POS/EAS/information terminal;
    initiating an NFC link between the NFC-enabled device and the terminal;
    interrogating the RFID and EAS tag by the terminal;
    receiving information pertaining to the product from a database;
    presenting the customer with a list of options regarding the product;
    executing a selected option from the list of options; and
    terminating the NFC link.

2. The method of claim 1, further comprising modulating a signal between the RFID and EAS tag and the terminal with a signal between the terminal and the NFC-enabled device.

3. The method of claim 1, wherein the selected option is a purchase request and wherein executing the selected option comprises:
    executing a secure transaction via the NFC-enabled device;
    changing the status of the RFID and EAS tag; and
    delivering a transaction receipt to the customer.

4. The method of claim 3, wherein the state of the EAS tag is changed to paid.

5. The method of claim 3, wherein the receipt is delivered by the NFC-enabled device.

6. The method of claim 1, wherein the selected option is a purchase and delivery request and wherein executing the selected option comprises:
    presenting the customer with product delivery options;
    executing a secure transaction via the NFC-enabled device; and
    delivering a transaction receipt to the customer.

7. The method of claim 1, wherein the selected option is an information request and wherein executing the selected option comprises:
    presenting the customer with product information options; and
    delivering the selected information to the customer.

8. The method of claim 7, further comprising initiating a Bluetooth link between the terminal and the NFC-enabled device.

9. The method of claim 1, wherein the selected option is a product video request and wherein executing the selected option comprises:
    presenting the customer with product video options;
    initiating a Bluetooth link between the terminal and the NFC-enabled device; and
    delivering the selected video to the customer.

10. The method of claim 1, wherein the selected option is a product characteristics request and wherein executing the selected option comprises:
    inquiring customer preferences for product characteristics;
    determining whether a product matching the customer preferences is present in inventory;
    presenting product availability details if the product is present in inventory; and
    presenting a conciliation offer if the product is not present in inventory.

11. The method of claim 10, wherein the customer preferences are pre-entered by the customer into the NFC-enabled device.

12. The method of claim 1, wherein the terminal comprises a processor, an NFC transreceiver, a Bluetooth transreceiver, and an antenna.

13. The method of claim 12, wherein the processor and the reader are adapted to prioritize UHG signals.

14. The method of claim 1, wherein the terminal further comprises a power source.

15. The method of claim 1, wherein a field area of a NFC transmissions is under 20 cm.

16. The method of claim 1, wherein the list of options is communicated to a customer by the NFC link.

17. The method of claim 1, wherein the selected option is a "find my size" option and wherein executing the selected option comprises:

querying a store database.

18. The method of claim 17, wherein a customer pre-entered customer preferences into the NFC-enabled device.

* * * * *